(12) United States Patent
Baulier et al.

(10) Patent No.: US 6,349,480 B1
(45) Date of Patent: Feb. 26, 2002

(54) STRIKER ALIGNMENT TOOL

(75) Inventors: Dominique Baulier; Doru Baluta, both of Windsor (CA)

(73) Assignee: Valiant Machine & Tool, Inc. (CA)

( * ) Notice: Subject to any disclaimer, the term of this patent is extended or adjusted under 35 U.S.C. 154(b) by 0 days.

(21) Appl. No.: 09/531,835

(22) Filed: Mar. 21, 2000

(51) Int. Cl.$^7$ ............................................. G01D 21/00
(52) U.S. Cl. ............................. 33/645; 33/600; 33/194
(58) Field of Search ......................... 33/194, 288, 613, 33/645, 600

(56) References Cited

U.S. PATENT DOCUMENTS

| | | | | |
|---|---|---|---|---|
| 4,058,902 A | * | 11/1977 | Hall ............................. | 33/194 |
| 5,111,593 A | * | 5/1992 | Gehen, Sr. .................... | 33/613 |
| 6,122,809 A | * | 9/2000 | Roy .............................. | 33/645 |
| 6,122,819 A | * | 9/2000 | Roy et al. ..................... | 33/600 |
| 6,151,793 A | * | 11/2000 | Carlen .......................... | 33/645 |

* cited by examiner

Primary Examiner—G. Bradley Bennett

(74) Attorney, Agent, or Firm—Gifford, Krass, Groh, Sprinkle, Anderson & Citkowski, P.C.

(57) ABSTRACT

A tool which facilitates the alignment of a closure striker with a latch on an automotive panel in which the automotive panel includes at least one alignment opening. The tool includes a plate having an outwardly projecting alignment pin(s) which is positioned within the alignment opening(s) on the automotive panel. A pair of spaced supports are secured to and extend outwardly from the other side of the plate and thus away from the automotive panel. An elongated guide rod is secured to and extends between the supports so that the guide rod is substantially parallel to the side of the plate abutting the automotive panel. A slide is longitudinally movably mounted on the guide rod and carries a striker to be secured to the automotive panel. A centering pin aligned with the striker is mounted to the slide. The latch on the automotive panel abuts against the centering pin when the panel is moved to a preset partially closed position. The engagement between the latch and the centering pin longitudinally displaces the slide along the rod until the striker is properly aligned with the latch. At the very end of its stroke, the latch engages a trigger which releases a pair of locking levers to secure the slide to the rod at its longitudinally adjusted position.

13 Claims, 4 Drawing Sheets

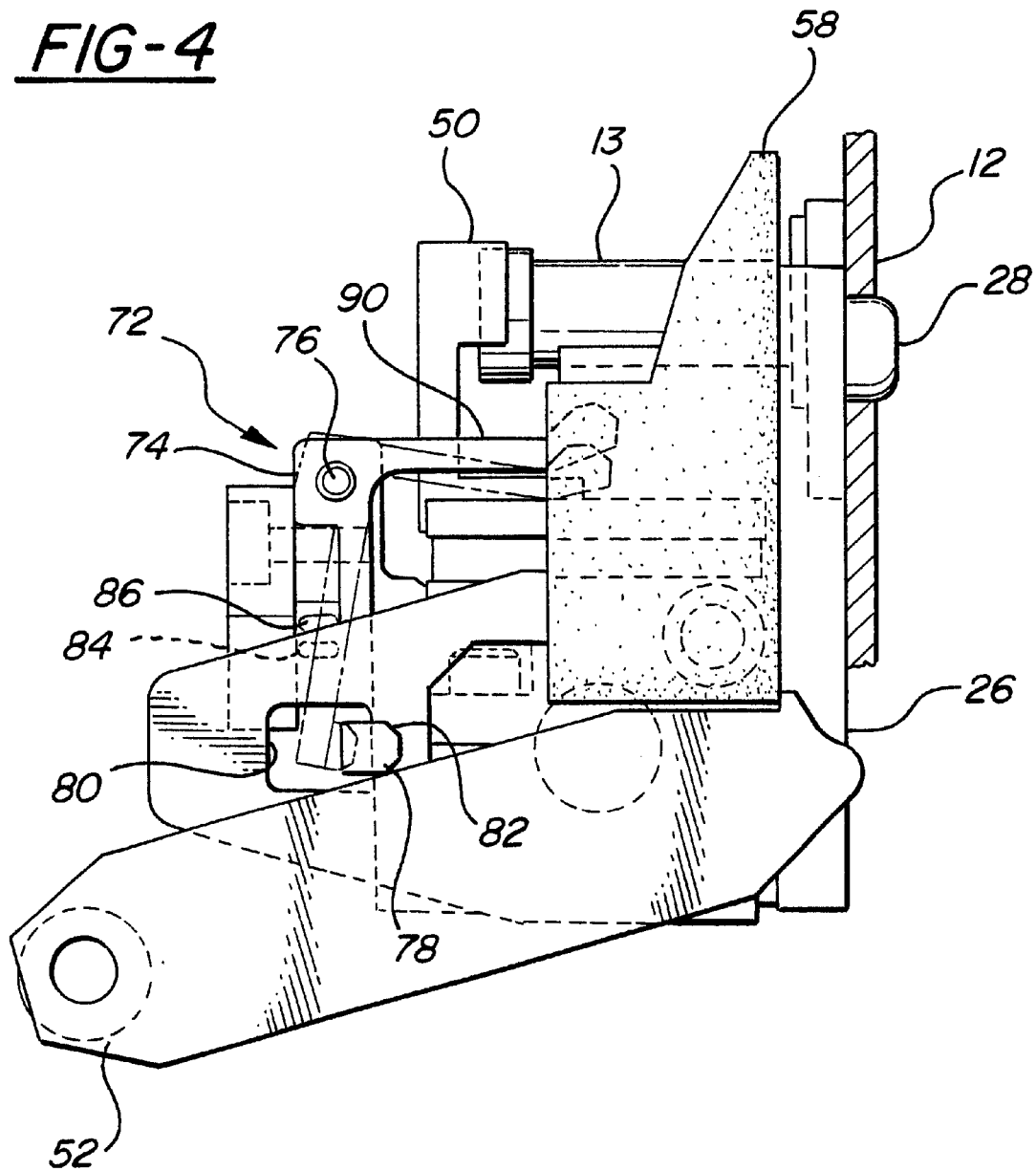

STRIKER ALIGNMENT TOOL

BACKGROUND OF THE INVENTION

I. Field of the Invention

The present invention relates generally to tools and, more particularly, to an alignment tool for the closure striker with a latch on an automotive panel.

II. Description of the Prior Art

Automotive vehicles, such as cars, vans, trucks and the like, include a number of different closures. Such closures include, for example, side doors, rear gates, hatchback closures, hoods, trunk lids and the like.

Such automotive closures are movable between an open position, in which the closure is spaced from the automotive panel, and a closed position, in which the closure is positioned closely adjacent the automotive panel. In order to both locate cross car and retain the closure in a closed position at the proper altitude, a striker is secured to the automotive panel which cooperates with a latch secured to the closure. Thus, as the closure is moved to its closed position, the latch engages and locks onto the striker.

Such automotive strikers typically comprise a cylindrical pin secured to the automotive panel. At least one, and oftentimes two, alignment openings are provided through the automotive panel to facilitate the proper alignment of the striker with the automotive panel with the latch on the automotive closure.

In many situations, however, due to both manufacturing as well as assembly tolerances, the striker, even if precisely positioned with respect to the alignment openings, will not be properly centered with the latch on the automotive closure. Consequently, it has been the conventional practice in the automotive industry to allow some adjustment of the precise position of the striker with respect to the automotive panel to ensure proper alignment between the latch and the striker.

In practice, in order to properly align the striker with the latch, an assembly worker will initially secure the striker to the automotive panel and then attempt to move the automotive closure to a closed position. If the closure cannot be moved to the closed position, or if such closure is difficult to achieve or result in an incorrect fitting, the assembly worker adjusts the position of the striker to compensate for misalignment of the striker with the latch and then again attempts to close the automotive closure. This procedure is iteratively repeated until satisfactory alignment of the striker with the latch is achieved, or rework downstream by another worker.

A primary disadvantage of this previously known method for aligning a striker on an automotive panel with a latch on an automotive closure is that it is time consuming and inaccurate.

SUMMARY OF THE INVENTION

The present invention provides an alignment tool which facilitates the alignment of the striker on an automotive panel which eliminates all of the above-mentioned disadvantages of the previously known devices.

In brief, the tool of the present invention comprises a plate having at least one outwardly projecting alignment pin. This plate has a first side adapted to abut against the automotive panel to which the striker will be attached so that the alignment pin is positioned within the alignment opening on the automotive panel. A couple of magnets cooperate to maintain this plate in a consistent contact with the automotive panel.

A pair of spaced supports are secured to and extend outwardly from the opposite side of the plate so that the supports are spaced apart from each other. An elongated guide rod is secured to and extends between the supports so that the guide rod is substantially parallel to the first side of the plate and thus parallel to the automotive panel.

A slide is longitudinally movably mounted on the guide rod. The slide includes a cradle which supports a striker at a predetermined position relative to the slide. This predetermined position is adjustable by shimming.

A centering pin is also secured to the cradle so that the centering pin is axially aligned with and protrudes outwardly from the striker. Upon movement of the automotive closure to a preset partially closed position, the latch engages the centering pin and longitudinally displaces the centering pin together with the slide until the centering pin, and thus the striker, is aligned with the latch. At the end of this stroke, the latch engages a locking mechanism on the tool which locks the slide to the rod at its longitudinally adjusted position. Thereafter, the closure can be opened and the striker secured to the automotive panel at its properly aligned position.

BRIEF DESCRIPTION OF THE DRAWING

A better understanding of the present invention will be had with reference to the accompanying description, when read in conjunction with the drawing, wherein like reference characters refer to like parts throughout the several views, and in which:

FIG. 4 is a side view illustrating the operation of the preferred embodiment of the present invention.

DETAILED DESCRIPTION OF A PREFERRED EMBODIMENT OF THE PRESENT INVENTION

Figure 1:
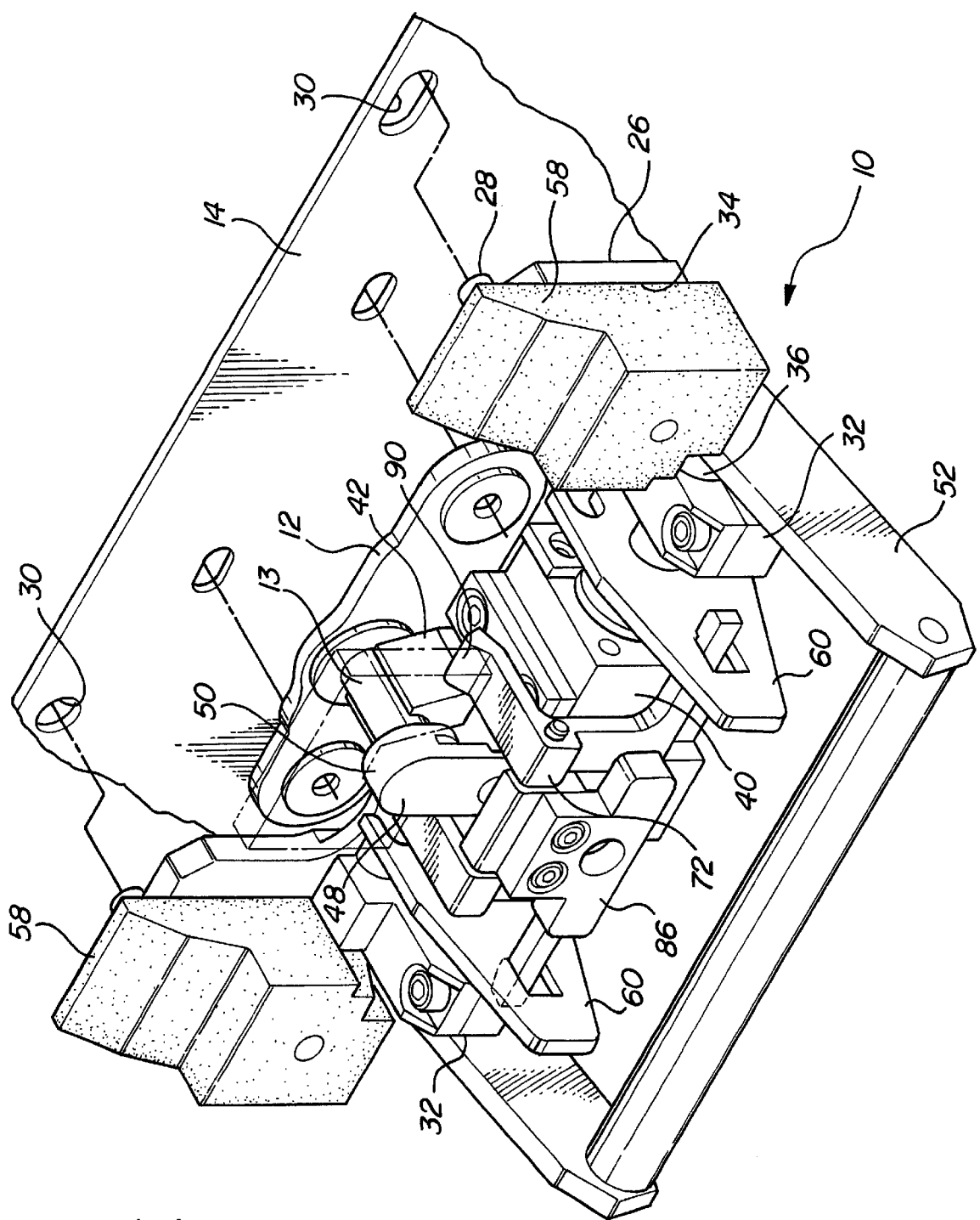
FIG. 1 is an elevational view illustrating a preferred embodiment of the present invention.
Figure 2:
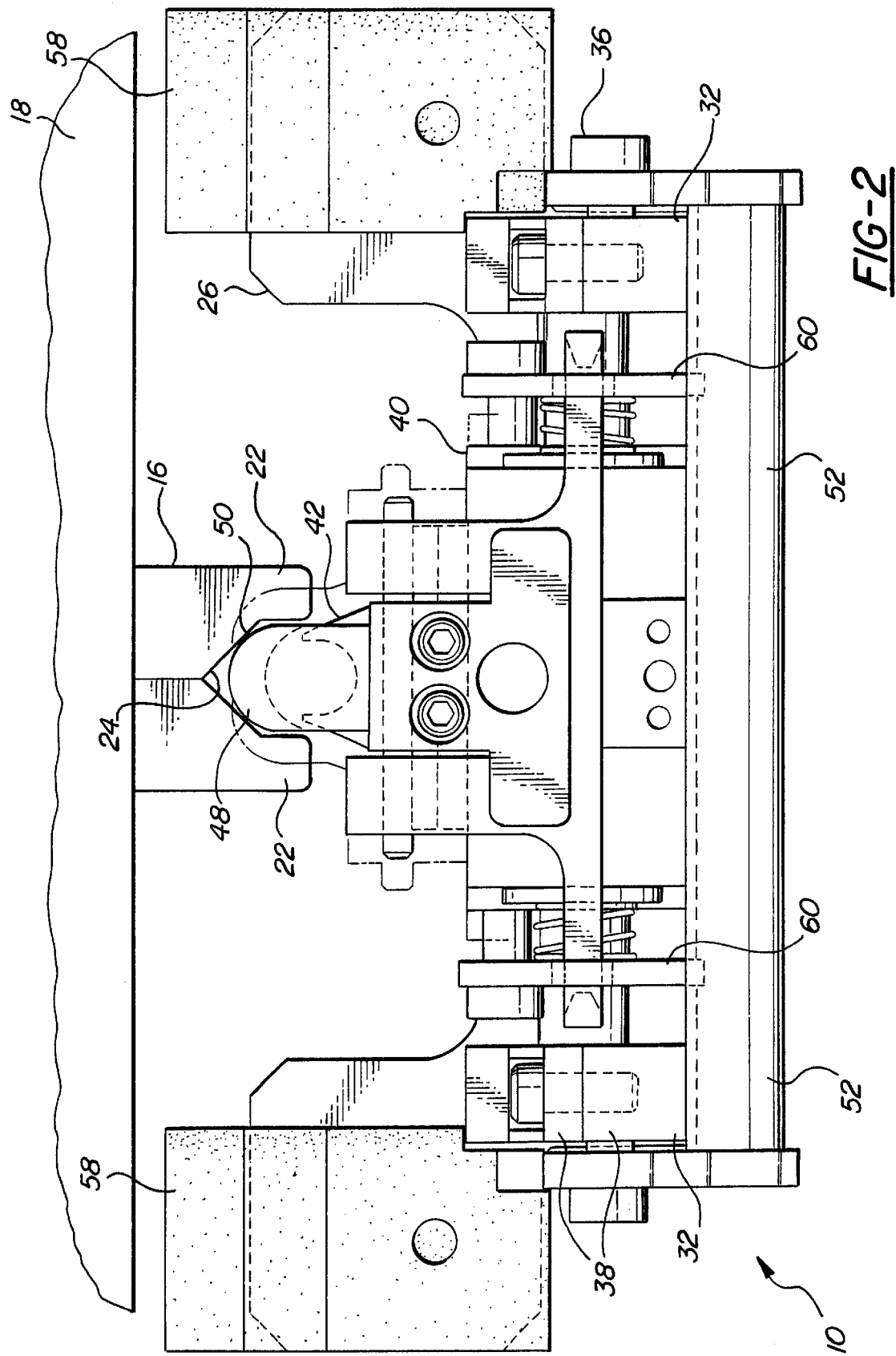
FIG. 2 is a back view illustrating the preferred embodiment of the present invention.

With reference first to FIGS. 1 and 2, a preferred embodiment of the striker alignment tool 10 of the present invention is shown for properly positioning a striker 12 having a cylindrical striker pin 13 to an automotive panel 14 so that the striker 12 is properly aligned with a latch 16 (FIG. 2) on an automotive closure panel 18 (FIG. 2), such as a hatch back. In the conventional fashion, the latch 16 includes two downwardly projecting wings 22 which form a U-shaped notch 24 between the wings 22. Ideally, the striker pin 13, once secured to the automotive panel 14, is directly aligned with the notch 24.

Figure 3:
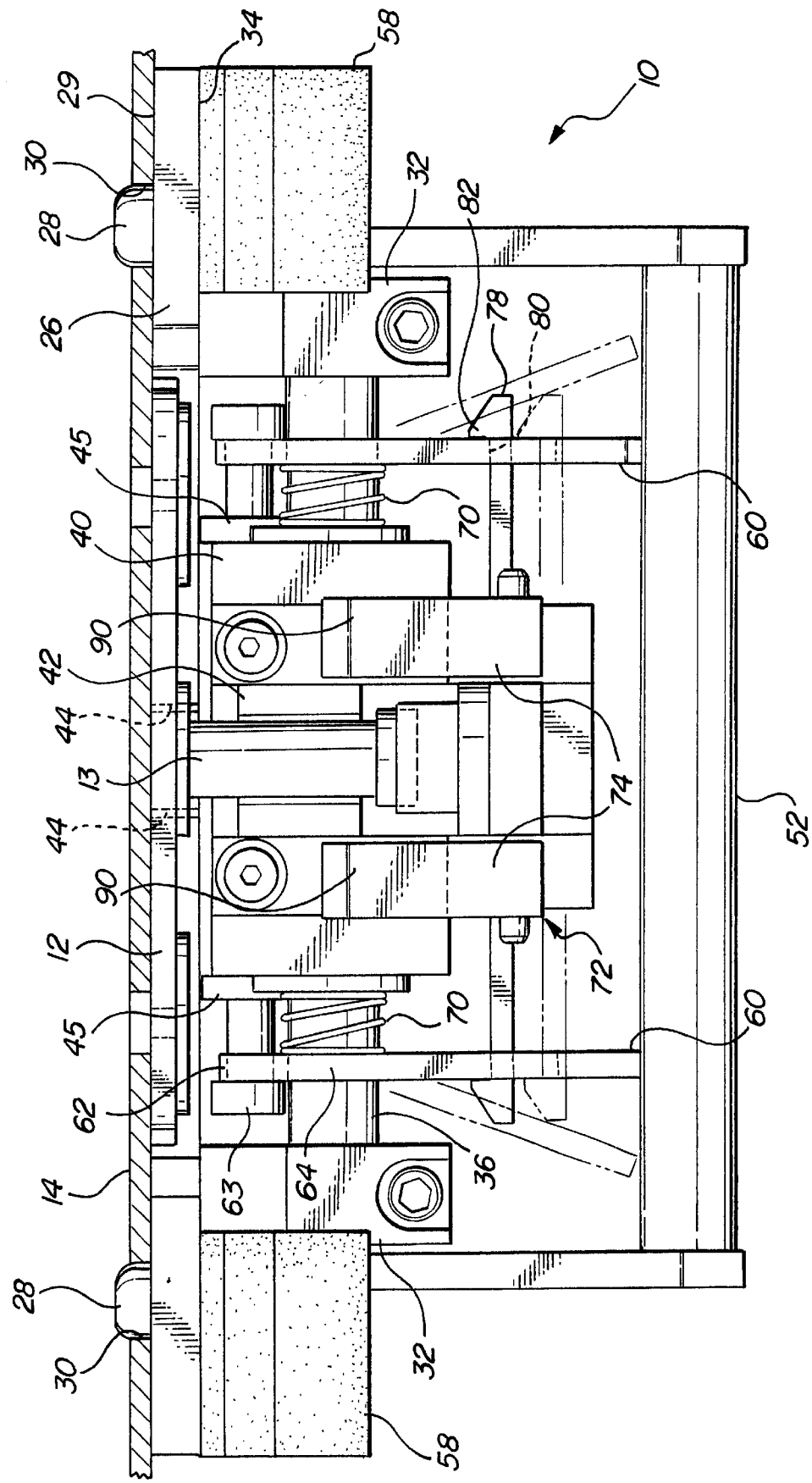
FIG. 3 is a top view illustrating the operation of a portion of the preferred embodiment of the present invention.

Referring to FIGS. 1–3, the tool 10 includes an elongated plate 26 having one side 29 adapted to abut against the automotive panel 14. Furthermore, at least one, and preferably two, alignment pins 28 protrude outwardly from the plate surface 29. These alignment pins 28 are adapted to be received within alignment openings 30 formed in the automotive panel 14. Consequently, with the pins 28 positioned in the alignment openings 30, the position of the plate 26 relative to the automotive panel 14 is fixed. A couple of magnets 57 cooperate to maintain in a consistent contact this plate 26 with the automotive panel 14.

A pair of spaced supports 32 are secured to and extend outwardly from a side 34 of the plate 26 opposite from the plate side 29. An elongated guide rod 36 extends between and is secured to the supports 32 so that the axis of the guide rod 36 is preferably parallel to the side 28 of the plate 26. Furthermore, the guide rod 36 is preferably circular in cross sectional shape, although other cross sectional shapes can be used without deviation from the spirit or scope of the invention.

Although each support 32 may be of any conventional construction, preferably, each support 32 includes a pair of jaws 38 (FIG. 2) which are compressed together by fasteners such that the ends of the guide rod 36 are sandwiched between the jaws 38. Conventional fasteners compress the jaws 38 together as well as secure the support 32 to the plate 26.

A slide 40 is longitudinally slidably mounted on the rod 36 so that the slide 40 is movable in a direction parallel to the automotive panel 14. This slide 40 includes a cradle 42 which supports the striker 12 at a predetermined position relative to the slide 40. A pair of lock pins 44 (FIG. 3) are also positioned through an opening in the striker 12 to prevent rotation of the striker 12 about the axis of its pin 13 such that the position of the striker 12 relative to the slide 40 is fixed within small tolerances. A pair of brass bearings 45 (FIG. 3) mounted to the slide 40 engage the side 34 of the plate 26 and prevent rotation of the slide 40 relative to the guide rod 36.

With reference now to FIGS. 1 and 2, a centering pin 48 is fixedly secured to the slide 40 by any conventional means. The centering pin 48 includes an upper arcuate surface 50 which is aligned with the striker pin 13 of the striker 12 supported in the cradle 42. Furthermore, the centering pin 48 has a radius or diameter so equal to the radius of the head of the striker pin 13 and overhang it for a reason to be subsequently described.

A handle 52 is preferably secured to the plate 26 to facilitate the positioning of the alignment pins 28 in the panel openings 30 and later on, the final removing of the tool 10 after fastening of the striker 12 on the automotive panel 14. Additionally, a pair of bumpers 58 are also preferably secured to the plate 26 which protect the automotive closure from an unexpected hard impact.

In order to align the striker 12 to the latch 16, the plate 28 is positioned against the automotive body panel 14 such that the alignment pins 28 are positioned within the alignment openings 30 in the automotive panel 14. A striker 12 is also positioned within and supported by the cradle 42. A couple of magnets 57 located inside of the bumpers 58 cooperate to maintain this plate in a consistent contact with the automotive panel 14.

With the pins 28 positioned in the openings 30, the automotive closure panel 18 is moved to a partially closed position as shown in FIG. 2. In doing so, the U opening 24 between the latch wings 22 engages the centering pin 50 and longitudinally displaces the slide 40 (as shown in phantom line) together with the striker pin 13 along the guide rod 36 so that the striker pin 13 is precisely aligned with the U opening 24.

With reference now to FIGS. 1 and 3, in order to lock the slide 40 at its longitudinally adjusted position along the guide rod 36, a pair of locking levers 60 are secured to the slide 40 with one locking lever 60 on each side of the slide 40. Since each locking lever is substantially identical to the other, only one will be described in detail, it being understood that a like description shall also apply to the other locking lever 60.

As best shown in FIG. 3, one end 62 of the locking lever is pivotally secured to the slide 40 so that the locking lever 60 can pivot about an axis perpendicular to the guide rod 36. Preferably, a fastener 63 having an enlarged head and extending through an oversized hole in the end 62 of the lever 60 forms the pivotal connection. The locking lever 60 also includes a through bore 64 through which the guide rod 36 extends. The through opening 64 is complementary in shape, but slightly larger than, the guide rod 36.

The locking lever 60 is movable between an unlocked position, shown in solid line in FIG. 3, and a locked position, shown in phantom line in FIG. 3. In its unlocked position, the locking lever 60 is generally perpendicular to the guide rod 36 so that the lever through openings 64 are aligned with the guide rod 36. With the lever 60 in the unlocked position, the slide 40 is able to freely longitudinally move along the guide rod 36.

Conversely, in its locked position, as shown in phantom line in FIG. 3, the locking lever 60 pivots about its end 62 so that the locking lever 60 is skewed relative to the guide rod 36. In its locked position, the locking lever 60 mechanically compresses or jams against the slide rod 36 thus locking the slide 40 to the rod 36. Furthermore, since the locking levers 60 are positioned on opposite sides of the slide 40, a balanced locking action of the slide 40 to the rod 36 is achieved.

A helical compression spring 70 is positioned around the guide rod 36 and sandwiched between each locking lever 60 and the slide 40 so that the springs 70 urge the locking levers 60 to their outer or locked position. A trigger assembly 72 retains the locking levers 60 in their unlocked position until the striker pin 13 is properly aligned with the latch 16.

With reference now to FIGS. 3 and 4, the trigger assembly 72 is there shown in greater detail and includes a pair of crank arms 74 which is pivotally mounted by a pivot pin 76 at a position intermediate the ends of the crank arm 74. The crank arm 74 is movable between a cocked position, shown in solid line in FIGS. 3 and 4, and a released position, shown in phantom line in FIGS. 3 and 4. One end 78 of the crank arm 74 is positioned through an opening 80 in the end of the locking lever 60 opposite from its pivotal connection with the slide 40. This end 78 of the crank arm 74, furthermore, includes an abutment lip 82 which abuts against the outside of its associated locking lever 60 when in the cocked position to thereby retain the locking lever 60 in the unlocked position. A compression spring 84 (FIG. 4) sandwiched between a spring retainer 86 and the crank arm 74 urges each crank arm 74 towards its cocked position.

The other ends 90 of the crank arms 74 are positioned adjacent and on opposite sides of the centering pin 50. Thus, the ends 90 of the crank arms 74 are aligned with the wings 22 of the latch 16 as the closure is moved toward a closed position.

In operation, with the alignment pins 28 positioned in their receiving holes 30 in the automotive panel 14 and the crank arms in their cocked position, as the closure panel 18 is moved to the preset partially closed position, the latch wings 22 engage the centering pin 50 and center the striker pin 13 with the latch 16 in the previously described fashion. Simultaneously, the wings 22 of the latch 16 engage the ends 90 of each crank arms 74 and pivot the crank arms 74 to their released positions thus moving the abutment surface 82 on the end 78 of each crank arm 74 out of engagement with its associated locking lever 60. Once the abutment surface 82 is moved out of engagement with the locking lever 60, the springs 70 immediately move the locking levers 60 to their locked position thus locking the slide 40 and striker 12 to an adjusted position in which the striker pin 13 is precisely aligned with the latch opening 24.

The vehicle closure 18 is then moved to an open position while retaining the positioning pins 28 in their positioning openings 30 and with the slide 40 secured to the rod 36 at its adjusted position. The striker 12 is then secured to the automotive panel 14 by conventional fasteners after which the tool 10 is removed from the vehicle. Upon removal, the locking levers 60 are moved to their unlocked position and the crank arms to their cocked position until the trigger assembly 72 engages and retains the locking levers in their unlocked position 60. A new striker 12 is positioned in the cradle 42 and the tool 10 is ready for subsequent use on the next vehicle.

It can therefore be seen that the present invention provides a simple and yet highly effective tool for rapidly and accurately aligning a striker to an automotive panel with a latch on a closure.

Having described my invention, however, many modifications thereto will become apparent to those skilled in the art to which it pertains without deviation from the spirit of the invention as defined by the scope of the appended claims.

What is claimed is:

1. A tool which facilitates the alignment of a closure striker on an automotive panel with a latch on an automotive closure in which the automotive panel includes at least one positioning opening, said tool comprising:

a plate with at least one outwardly projecting alignment pin, said plate having a first side adapted to abut against the automotive panel so that said alignment pin is positioned in the alignment opening, a pair of spaced supports secured to and extending outwardly from a second side of said plate, said second side of said plate being opposite from said first side of said plate, an elongated guide rod secured to and extending between said supports so that said guide rod is substantially parallel to said first side of said plate, a slide longitudinally movably mounted on said guide rod, a cradle on said slide for supporting a striker at a predetermined position relative to said slide, means on said slide for engaging the latch upon partial closure of the panel to a preset position and for longitudinally moving said slide to an adjusted position in which the striker is aligned with the latch, means on said slide for locking said slide to said rod in said adjusted position upon partial closure of the panel to said preset position.

2. The invention as defined in claim 1 wherein said engaging and moving means comprises a centering pin axially aligned with the striker.

3. The invention as defined in claim 2 wherein the striker is cylindrical in shape and wherein said centering pin includes a semi-cylindrical abutment surface having a radius equal to the radius of the striker head and overhanging it.

4. The invention as defined in claim 1 wherein said locking means comprises a lever mounted to said slide and movable between a locked position in which said lever abuts against said rod and prevents movement of said slide relative to said rod and an unlocked position in which said slide is freely movable on said rod, means for resiliently urging said lever towards said locked position, and a trigger assembly which cooperates with the latch for retaining said lever in said unlocked position until the panel is moved to said preset position.

5. The invention as defined in claim 4 wherein said lever is elongated having a first end pivotally connected to said slide, said trigger engaging a second end of said lever, said lever having an opening intermediate its ends through which said rod extends, said lever opening having a cross sectional area greater than a cross sectional area of said rod.

6. The invention as defined in claim 5 wherein said rod is circular in cross sectional shape.

7. The invention as defined in claim 1 and comprising at least one magnet mounted to said plate.

8. The invention as defined in claim 1 and comprising means to prevent rotation of said slide relative to said rod.

9. The invention as defined in claim 8 wherein said rotation preventing means comprises a bearing secured to said slide which abuts against said second side of said plate.

10. The invention as defined in claim 4 wherein said trigger assembly comprises a crank arm pivotally mounted at an intermediate point to said slide about an axis substantially parallel to said rod, the latch adapted to engage a first end of said crank arm when the panel is in said preset position, and a catch attached to the opposite end of said crank arm which selectively engages said lever.

11. The invention as defined in claim 1 wherein said locking means comprises a pair of levers mounted on opposite sides of said slide, each lever movable between a locked position in which each said lever abuts against said rod and prevents movement of said slide relative to said rod and an unlocked position in which said slide is freely movable on said rod, means for resiliently urging said levers towards said locked position, and a trigger which cooperates with the latch for retaining said levers in said unlocked position until the panel is moved to said preset partially closed position.

12. The invention as defined in claim 1 and comprising a bumper secured to said plate which engages the panel when the panel is in said preset position.

13. The invention as defined in claim 1 wherein said cradle for supporting a striker is shippable in the vertical direction to suit also the final altitude of the closure.

* * * * *